(12) United States Patent
Manzoor (10) Patent No.: US 10,955,026 B2
(45) Date of Patent: Mar. 23, 2021

(54) ARCUATE COMMON VERTEX AND DUAL ARCUATE COMMON VERTEX SPRING DAMPER SYSTEMS

(71) Applicant: Suhale Manzoor, Plymouth, MI (US)

(72) Inventor: Suhale Manzoor, Plymouth, MI (US)

(73) Assignee: OPTIMIZED SOLUTIONS, LLC, Plymouth, MI (US)

( * ) Notice: Subject to any disclaimer, the term of this patent is extended or adjusted under 35 U.S.C. 154(b) by 0 days.

(21) Appl. No.: 16/815,237

(22) Filed: Mar. 11, 2020

(65) Prior Publication Data

US 2020/0300333 A1    Sep. 24, 2020

Related U.S. Application Data

(60) Provisional application No. 62/821,494, filed on Mar. 21, 2019.

(51) Int. Cl.
*F16F 15/30* (2006.01)
*F16F 15/14* (2006.01)

(52) U.S. Cl.
CPC .......... *F16F 15/1435* (2013.01); *F16F 15/30* (2013.01)

(58) Field of Classification Search
CPC ...... F16F 15/136; F16F 15/14; F16F 15/1435; F16F 15/1442; F16F 15/167; F16F 15/30; F16F 15/31
See application file for complete search history.

(56) References Cited

U.S. PATENT DOCUMENTS

| | | | | |
|---|---|---|---|---|
| 2,667,767 A * | 2/1954 | Burrell | ............... | B60B 17/0034 464/91 |
| 3,196,710 A * | 7/1965 | Peirce | ................. | F16F 15/1442 74/574.4 |
| 3,440,899 A * | 4/1969 | Ward | .................. | F16F 15/1442 464/68.3 |
| 4,023,438 A * | 5/1977 | Birkle | .................... | F02B 77/00 74/574.4 |
| 4,270,645 A * | 6/1981 | Beccaris | ............... | F16F 15/127 192/210.1 |
| 4,368,807 A * | 1/1983 | McLean | .............. | F16F 15/1442 188/322.5 |
| 9,121,471 B2 * | 9/2015 | Manzoor | ............. | F16F 15/1442 |
| 9,500,260 B2 * | 11/2016 | Hemphill | ............ | F16F 15/1442 |
| 9,599,209 B2 * | 3/2017 | Manzoor | ............... | F16F 15/126 |
| 10,151,379 B2 * | 12/2018 | Manzoor | ................ | F16H 55/36 |

(Continued)

FOREIGN PATENT DOCUMENTS

EP    1396656 A1 *   3/2004   .......... F16F 15/1442

OTHER PUBLICATIONS

Machine translation of EP 1396656 A1 obtained on Sep. 8, 2020.*

*Primary Examiner* — Adam D Rogers (57) ABSTRACT

The disclosed invention is a novel method for constructing an Arcuate Common Vertex Spring Damper System, that can either be used as a single spring for a torsional vibration application or be used in pairs as a Dual Arcuate Common Vertex Spring Dampers System. Both these constructions yield significant improvements over the conventional Common Vertex and Dual Common Vertex seen in prior art, such as promoting a radially tighter packaging envelop, allowing the resulting device to be tuned across a greater torsional frequency range, and improving the modal decoupling response of the resulting device.

15 Claims, 4 Drawing Sheets

(56) References Cited

U.S. PATENT DOCUMENTS

2016/0195160 A1\* 7/2016 Leinfelder .......... F16F 15/1442
 464/87
2017/0234419 A1\* 8/2017 Manzoor ................ F16H 55/36
 474/94

\* cited by examiner

ARCUATE COMMON VERTEX AND DUAL ARCUATE COMMON VERTEX SPRING DAMPER SYSTEMS

FIELD OF INVENTION

The present invention generally relates to torsional spring damper systems. More particularly the invention teaches a novel method of constructing Arcuate Common Vertex and Dual Arcuate Common Vertex spring damper systems that yield significant packaging and performance improvements over prior art.

BACKGROUND

Vibrating shafts have torsional vibrations inherent due to their non-uniform construction (e.g. crankshafts, and camshafts), or the nature of the driving mechanism employed (e.g. firing order of an internal combustion engine, or type of gearing), or the method employed for their connection to another shaft (e.g. through a universal, or a constant-velocity joint). These torsional vibrations if left unattended, reach a peak amplitude when their exciting frequency coincides with the natural torsional frequency of the shaft. This phenomenon known as resonance can cause premature fatigue failure of the shaft or can be felt as undesirable noise or vibration by a vehicle or machine operator.

Torsional Vibration Dampers (TVDs) are commonly employed to attenuate such undesirable vibrations. The objective of a TVD is to break the vibratory amplitude peak at resonance to two (or more) smaller peaks which have sufficiently reduced amplitudes that can be sustained by the shaft.

Most often, a TVD consists of a metallic bracket called the hub that rigidly attaches to the vibrating shaft. An active metallic inertial component called the ring that provides the inertial system, and an elastomeric member that connects the hub and the ring and provides the requisite spring-damper system. The TVD is tuned (by adjusting inertia, and spring-stiffness) such that the TVD attenuates the torsional vibrations of the shaft at resonance by vibrating at the same frequency but exactly out of phase with the vibrating shaft, thereby essentially cancelling the vibration.

Most commonly, two elastomer geometric configurations are utilized in TVDs: (1) when the elastomer is oriented parallel to the Axial Center Line (ACL) of the TVD (axial construction); and (2) when the elastomer is oriented orthogonal to the ACL of the TVD (radial construction). In radial constructions, a bonded Common Vertex (CV) design is generally used for three main reasons: (1) it enables the first mode-shape of the TVD to be torsional; (2) it enables the TVD to be have adequate modal decoupling (separation of the torsional mode from the non-torsional modes); and (3) it enables a relatively consistent strain profile through the cross-section of elastomer during the application. For the remainder of the disclosure, only the radial construction will be discussed as the invention falls into this design category.

Figure 1:
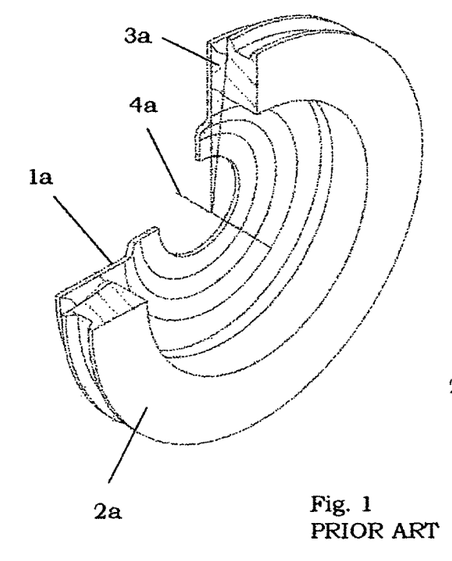
FIG. 1 is a partial cross-sectional view illustrating the internal structure of a prior art TVD with a radial construction.

FIG. 1 illustrates a conventional radially constructed TVD that is employed in the industry today. Such a TVD has three components: a hub 1a that is usually a cast-and-machined, stamped, or a spun metallic component, an inertia ring 2a that is usually a cast-and-machined component that may have a poly-vee, v-groove, or any other feature, on its outermost radial periphery to receive a belt, and a bonded elastomer ring 3a that holds hub 1a and ring 2a mutually in place while simultaneously providing the spring-damper system for the TVD. The elastomer member 3a, is mold-bonded by applying a primer-adhesive combination to the corresponding mating surfaces of hub 1a and ring 2a and either injection or transfer-molding the elastomer 3a between hub 1a and ring 2a.

The reason the device illustrated in FIG. 1 is known to employ a CV design is because by linearly extending the two axially bounding surfaces of elastomer 3a (i.e. the surfaces that are bonded to the hub and the ring) a CV is obtained at ACL 4a. This subtle but key feature is essential for the TVD to function properly as explained above.

Figure 2:
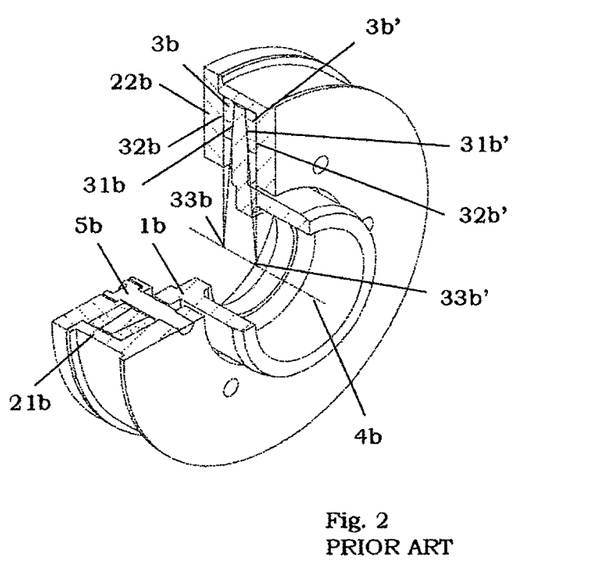
FIG. 2 is a partial cross-sectional view illustrating the internal structure of a prior art TVD with a radial construction employing dual springs.

FIG. 2 illustrates another conventional radially constructed TVD that uses a set of a pre-molded Dual-CV (DCV) elastomer members. Here, the compound ring is constructed using two mating pieces 21b and 22b that are connected by a plurality of shoulder bolts 5b. Elastomer members 3b and 3b' axially bound the centrally located hub 1b on either side and are compressed by the preload exerted due to tightening the shoulder bolts 5b and bringing the two pieces 21b and 22b of the compound ring in rigid mutual contact. The elastomer surfaces 31b, 32b, 31b', and 32b' are offset axially outward to their corresponding mating surfaces on the hub 1b and compound ring comprising of pieces 21b and 22b, before assembly. Thus, allowing the elastomer members 3b and 3b' to be axially compressed by a uniform amount through their radial lengths (usually between 10% to 40%) after assembly.

Linearly extending the axially bounding surfaces 31b and 32b of elastomer member 3b produces a CV 33b at ACL 4b. Similarly, linearly extending the axially bounding surfaces 31b' and 32b' of elastomer member 3b' produces a CV 33b' at ACL 4b. This construction allows the TVD to be held together mechanically without necessitating bonding between elastomer members 3b and 3b' with hub 1b or with the two pieces 21b and 22b of the compound ring. The working of the DCV design is essentially the same as utilizing two CV springs in parallel.

Prior art exists where the ring and the hub exchange positions. There the hub has a compound structure comprising of 2 pieces that axially compresses the elastomer while the ring comprises of a one-piece structure and is centrally located between the two elastomer members. This essentially yields the same DCV configuration as illustrated in FIG. 2 with the positions of the hub and ring interchanged. Furthermore, prior art exists that teaches different methods of compressing the elastomer apart from shoulder bolts, including but not limited to press-fitting, roll-forming, using standard fasteners etc. These also, essentially yield the same DCV configuration as illustrated in FIG. 2.

Figure 3:
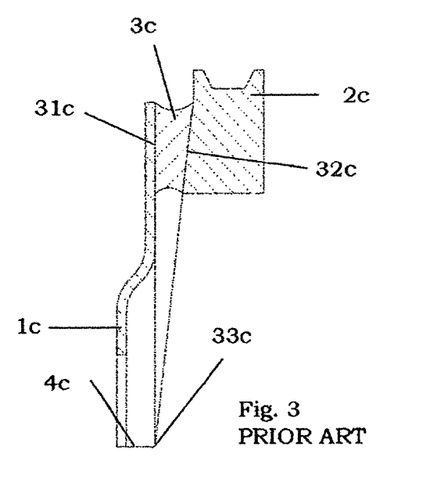
FIG. 3 is a cross-sectional view illustrating the internal structure of a prior art TVD with a radial CV design where the elastomer has a surface orthogonal to the ACL on the hub side and a surface inclined to the ACL on the ring side.

FIG. 3 illustrates a cross-section of a conventional TVD using the most common CV construction, where surface 31c, and surface 32c of elastomer member 3c form a CV 33c at ACL 4c. Here surface 31c that is bonded to hub 1c is orthogonal to ACL 33c while surface 32c that is bonded to ring 2c is inclined to ACL 33c. This construction may be reversed where surface 31c is inclined to ACL 33c while surface 32c is orthogonal to the ACL 4c.

Figure 4:
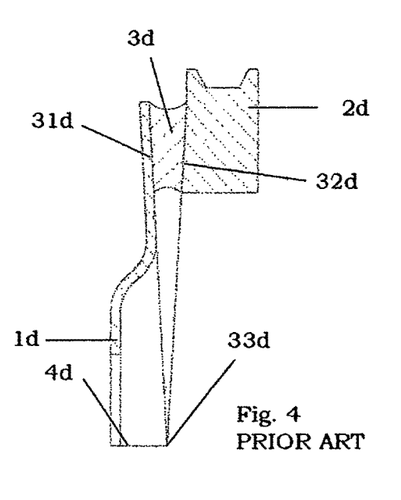
FIG. 4 is a cross-sectional view illustrating the internal structure of a prior art TVD with a radial CV design where the elastomer has both of its surfaces (on the hub and the ring side) inclined to the ACL.

FIG. 4 illustrates the cross-section of a conventional TVD using an alternate CV construction, where surface 31d, and surface 32d of elastomer member 3d form a CV 33d at ACL 4d. Here surface 31d that is bonded to hub 1d and surface 32d that is bonded to ring 2d are both inclined to ACL 4d. This construction may be such where the angles of inclination are symmetric (both angles are equal) or where the angles of inclination are asymmetric (both angles are different).

In all the prior-art that has been discussed up to this point, it can be appreciated that there is essentially one resulting geometric feature: the radial cross-cross-sectional area of the elastomer spring increases linearly proportionately with its radial distance from the ACL. This is because, when the TVD works a vibratory application, the ring angularly deflects with respect the hub. Elastomer at the outermost radial periphery undergoes larger strain than the elastomer at the innermost radial periphery for the same angular deflection. Therefore, to ensure a uniform strain buildup through the elastomer section and enhance the fatigue life of the elastomer such a proportionality is desired. This is the essence of a CV construction.

The rigid geometric constraints of CV or DCV constructions make them cumbersome to package in a radially limited envelope. Both these constructions yield a very limited range for tuning the TVD to a torsional frequency, generally making them suitable only for low frequency applications. Furthermore, modal-decoupling of such TVDs is complicated as the torsional and radial modes of vibration are difficult to mutually separate. This is because they are both concerned with the shear stiffness of the elastomer spring and tend to overlap in frequency.

A radially constructed design that can fit in a radially smaller packaging envelope, that allows a greater torsional tuning range, and improves modal decoupling is needed.

SUMMARY OF INVENTION

The disclosed invention is a novel method for radially constructing a spring damper system that allows the resulting device to have a smaller radial envelope, a greater range for torsional tuning, and an improved modal decoupling over prior art.

The disclosed invention comprises of the elastomer having an Arcuate Common Vertex Spring Damper System (ACV-SDS) that results by extending the two axially bounding arcuate surfaces of the elastomer member along their non-linear arcuate paths such that they share a coincidental Arcuate Common Vertex (ACV) and a mutual Point Of Tangency (POT) at the ACL. This construction can be extended to a Dual Arcuate Common Vertex Spring Damper System (DACV-SDS) that utilizes two separate elastomer ACV-SDS members in parallel. All the prior art that has been contemplated to this point using CV designs and DCV designs can take advantage of the disclosed invention to improve their packaging and performance.

Any material can be used for constructing the ACV-SDS and the DACV-SDS so-long-as it enables the ACV-SDS or the DACV-SDS to have a finite spring-stiffness and a finite damping-coefficient. Such materials include but are not limited to (1) Thermo-Set Elastomers including but not limited to Natural Rubber (NR), Styrene-Butadiene Rubber (SBR), Acrylonitrile Butadiene Rubber (NBR), Ethelene Propylene Diene Monomer (EPDM), Poly-Butadiene (PBD) etc.; (2) Thermo-Plastic Elastomers (TPEs); (3) Synthetic Polymers including but not limited to Glass-Filled Nylon, Non-Glass Filled Nylon, Polyethylene, Polycarbonates, Polyvinyl etc.

This invention and the method of assembly thereof may be further appreciated considering the following detailed description and drawings in which:

DETAILED DESCRIPTION

Figure 5:
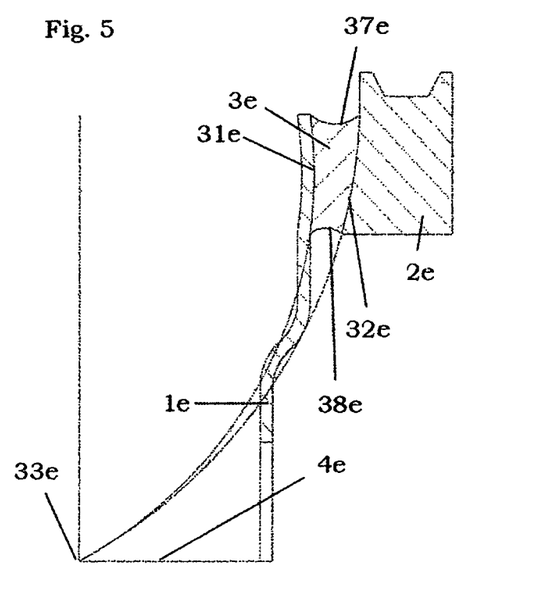
FIG. 5 is a cross-sectional view illustrating an embodiment of the invention in a TVD where the ACV-SDS comprises of a concave and a convex surface.

FIG. 5 illustrates a TVD including an embodiment of the invention comprising of an ACV-SDS $3e$ that is bonded to a metallic hub $1e$ and a metallic ring $2e$ on its axial peripheries. The axially bounding arcuate surface of ACV-SDS $31e$ that is bonded to hub $1e$ is concave; while the axially bounding arcuate surface of ACV-SDS $32e$ that is bonded to ring $2e$ is convex. Arcuate surfaces $31e$ and $32e$ are bounded at their radially outermost periphery by surface $37e$ and at their radially innermost periphery by surface $38e$. Arcuate surfaces $31e$ and $32e$ when extended along their non-linear arcuate paths form a coincidental ACV and a POT $33e$ at ACL $4e$. The relative positions of hub $1e$ and ring $2e$ may be switched mutually to obtain the same geometry of ACV-SDS $3e$.

Figure 6:
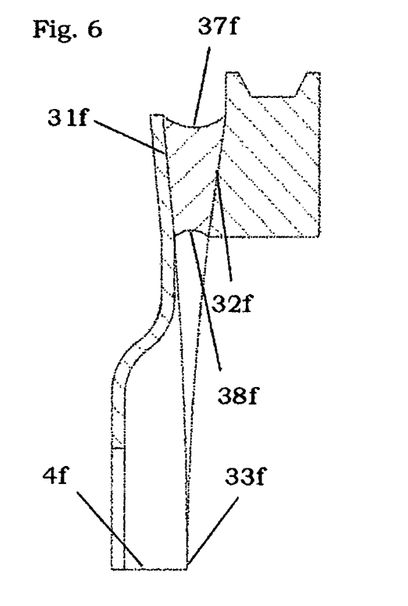
FIG. 6 is a cross-sectional view illustrating an embodiment of the invention in a TVD where the ACV-SDS comprises of two concave surfaces.

FIG. 6 illustrates a TVD including another embodiment of the invention comprising of an ACV-SDS $3f$ that is bonded to a metallic hub $1f$ and a metallic ring $2f$ on its axial proximities. Both the axially bounding arcuate surfaces of ACV-SDS $31f$ and $32f$ are concave. Arcuate surfaces $31f$ and $32f$ are bounded at their radially outermost periphery by surface $37f$ and at their radially innermost periphery by surface $38f$. These arcuate surfaces $31f$ and $32f$ when extended along their non-linear arcuate paths form a coincidental ACV and a POT 33f at ACL 4f. The relative positions of the hub 1f and the ring 2f may be switched mutually to obtain the same geometry of ACV-SDS 3f.

Figure 7:
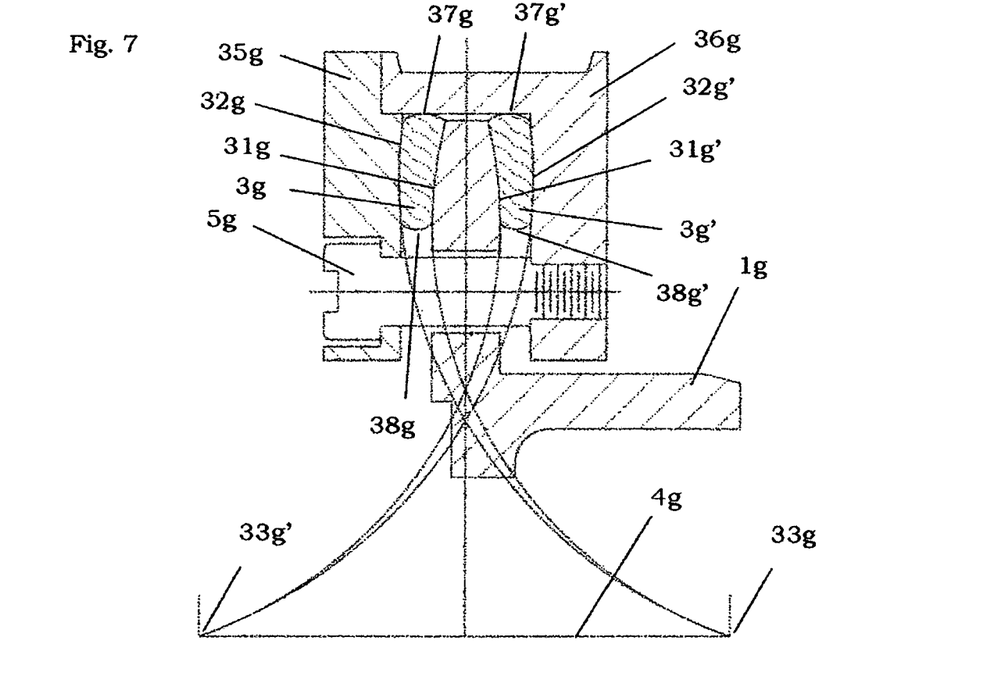
FIG. 7 is a cross-sectional view illustrating an embodiment of the invention in a TVD where the DACV-SDS comprises of two ACV-SDSs each comprising of concave and a convex surface and oriented with their concave surfaces being axially proximate.

FIG. 7 illustrates a TVD including another embodiment of the invention using a DACV-SDS comprising of two identical pre molded ACV-SDSs 3g and 3g' that axially bound hub 1g on either side and are axially bounded by a two-piece compound ring 35g and 36g. The TVD is held together by a plurality of shoulder bolts 5g. Such a construction is essentially non-bonded and behaves like two ACV-SDSs working in parallel. Arcuate surfaces 31g and 32g are bounded at their radially outermost periphery by surface 37g and at their radially innermost periphery by surface 38g. ACV-SDSs are such that the arcuate surfaces 31g and 32g of ACV-SDS 3g when extended along their non-linear arcuate paths form an ACV and a POT 33g at ACL 4g. Similarly, arcuate surfaces 31g' and 32g' are bounded at their radially outermost periphery by surface 37k' and at their radially innermost periphery by surface 38g'. Arcuate surfaces 31g' and 32g' of ACV-SDS 3g' when extended along their non-linear arcuate paths form an ACV and a POT 33g' at ACL 4g'. Furthermore, ACV-SDS 3g has one concave surface 31g and one convex surface 32g, and ACV-SDS 3g' has one concave surface 31g' and one convex surface 32g'. The concave surfaces and 31g and 31g' are mutually axially proximate.

Figure 8:
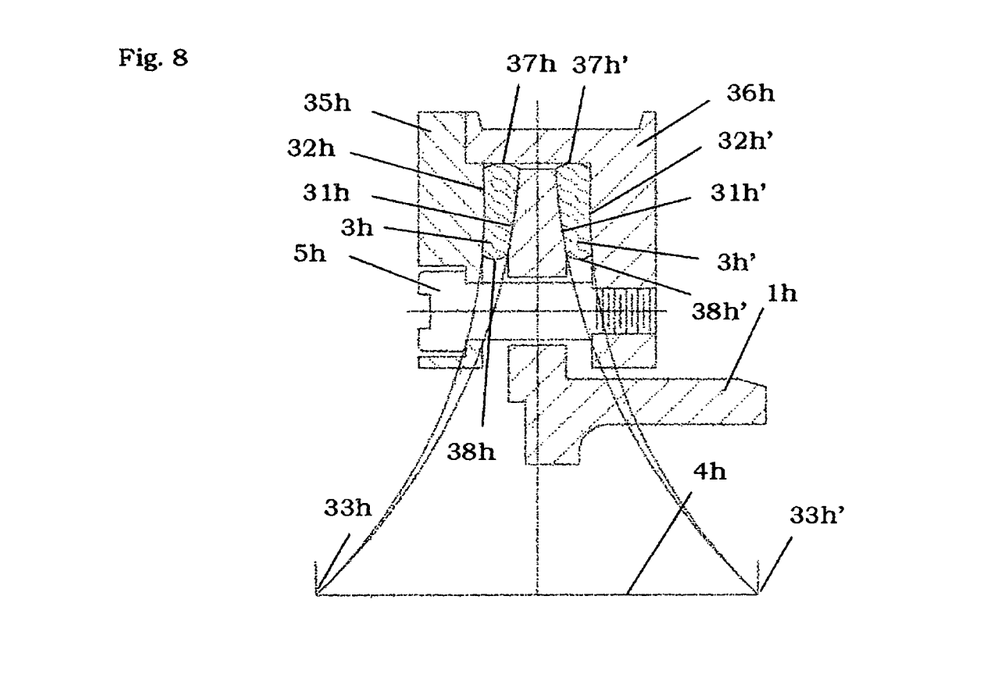
FIG. 8 is a cross-sectional view illustrating an embodiment of the invention in a TVD where the DACV-SDS comprises of two ACV-SDSs each with a concave and a convex surface and oriented with their convex surfaces being axially proximate.

FIG. 8 illustrates a TVD including another embodiment of the invention using a DACV-SDS comprising of two identical pre-molded ACV-SDSs 3h and 3h' that axially bound hub 1h on either side and are axially bounded by a two-piece compound ring 35h and 36h. The TVD is held together by a plurality of shoulder bolts 5h. Such a construction is essentially non-bonded and behaves like two ACV-SDSs working in parallel. Arcuate surfaces 31h and 32h are bounded at their radially outermost periphery by surface 37h and at their radially innermost periphery by surface 38h. ACV-SDSs are such that arcuate surfaces 31h and 32h of ACV-SDS 3h when extended along their non-linear arcuate paths form an ACV and a POT 33h at ACL 4h. Similarly, arcuate surfaces 31h' and 32W are bounded at their radially outermost periphery by surface 37h' and at their radially innermost periphery by surface 38h'. Arcuate surfaces 31h' and 32W of ACV-SDS 3h' when extended along their non-linear arcuate paths form an ACV and a POT 33h' at ACL 4h'. Furthermore, ACV-SDS 3h has one concave surface 31h and one convex surface 32h, and ACV-SDS 3W has one concave surface 31h' and one convex surface 32h'. The convex surfaces and 31h and 31h' are mutually axially proximate.

Figure 9:
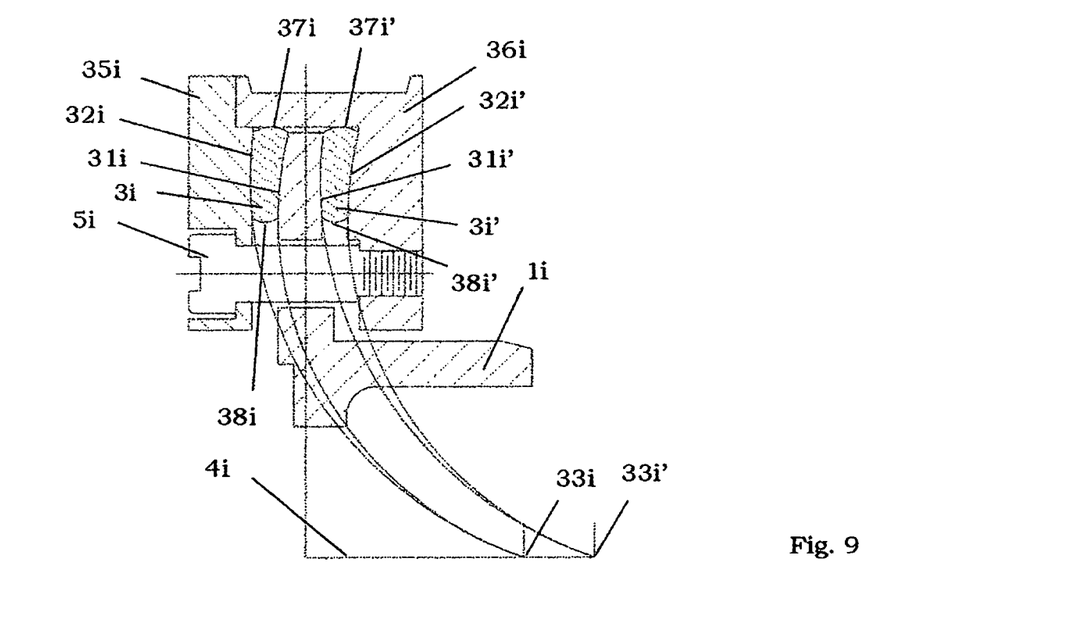
FIG. 9 is a cross-sectional view illustrating an embodiment of the invention in a TVD where the DACV-SDS comprises of two ACV-SDSs each with a concave and a convex surface and oriented with one concave and one convex surface being axially proximate.

FIG. 9 illustrates a TVD including another embodiment of the invention using a DACV-SDS comprising of two identical pre-molded ACV-SDSs 3i and 3i' that axially bound hub 1i on either side and are axially bounded by a two-piece compound ring 35i and 36i. The TVD is held together by a plurality of shoulder bolts 5i. Such a construction is essentially non-bonded and behaves like two ACV-SDSs working in parallel. Arcuate surfaces 31i and 32i are bounded at their radially outermost periphery by surface 37i and at their radially innermost periphery by surface 38i. ACV-SDSs are such that arcuate surfaces 31i and 32i of ACV-SDS 3i when extended along their non-linear arcuate paths form an ACV and a POT 33i at ACL 4i. Similarly, arcuate surfaces 31i' and 32i' are bounded at their radially outermost periphery by surface 37i' and at their radially innermost periphery by surface 38i'. Arcuate surfaces 31i' and 32i' of ACV-SDS 3i' when extended along their non-linear arcuate paths form an ACV and a POT 33i' at ACL 4i'. Furthermore, ACV-SDS 3i has one concave surface 31i and one convex surface 32i, and ACV-SDS 3i' has one concave surface 31i' and one convex surface 32i'. The concave surface 31i and convex surface 31i' are mutually axially proximate.

Figure 10:
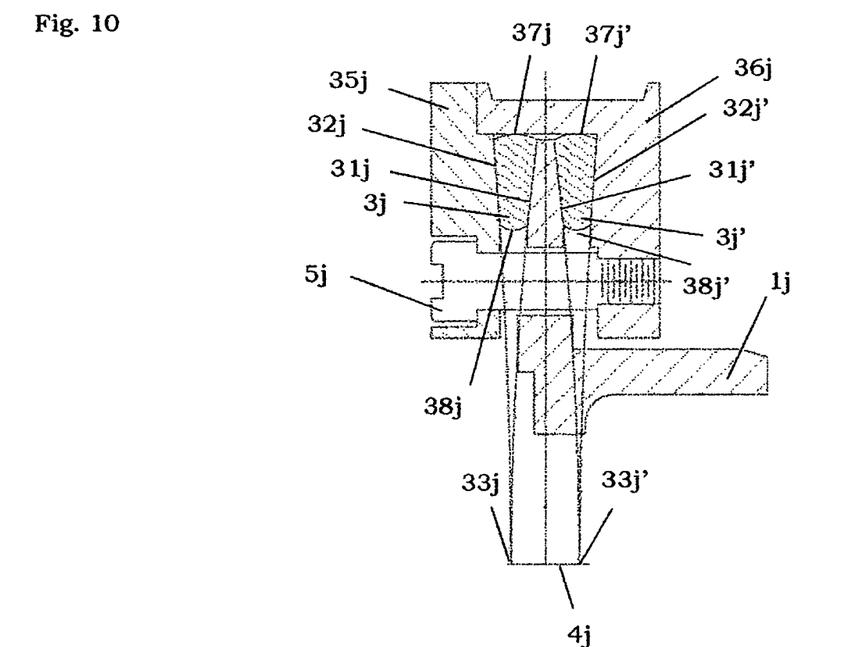
FIG. 10 is a cross-sectional view illustrating an embodiment of the invention in a TVD where the DACV-SDS comprises of two ACV-SDSs each with two concave surfaces.

FIG. 10 illustrates a TVD including another embodiment of the invention using a DACV-SDS comprising of two identical pre-molded ACV-SDSs 3j and 3j' that axially bound hub 1j on either side and are axially bounded by a two-piece compound ring 35j and 36j. The TVD is held together by a plurality of shoulder bolts 5j. Such a construction is essentially non-bonded and behaves like two ACV-SDSs working in parallel. Arcuate surfaces 31j and 32j are bounded at their radially outermost periphery by surface 37j and at their radially innermost periphery by surface 38j. ACV-SDSs are such that arcuate surfaces 31j and 32j of ACV-SDS 3j when extended along their non-linear arcuate paths form an ACV and a POT 33j at ACL 4j. Similarly, arcuate surfaces 31j' and 32j' are bounded at their radially outermost periphery by surface 37j' and at their radially innermost periphery by surface 38j'. Arcuate surfaces 31j' and 32j' of ACV-SDS 3j' when extended along their non-linear arcuate paths form an ACV and a POT 33j' at ACL 4j'. Furthermore, ACV-SDS 3j has both axially bounding surfaces 31j and 32j concave, and ACV-SDS 3i' has both axially bounding surfaces 31j' and 32j' concave. The concave surface 31j and concave surface 31j' are mutually axially proximate.

Figure 11:
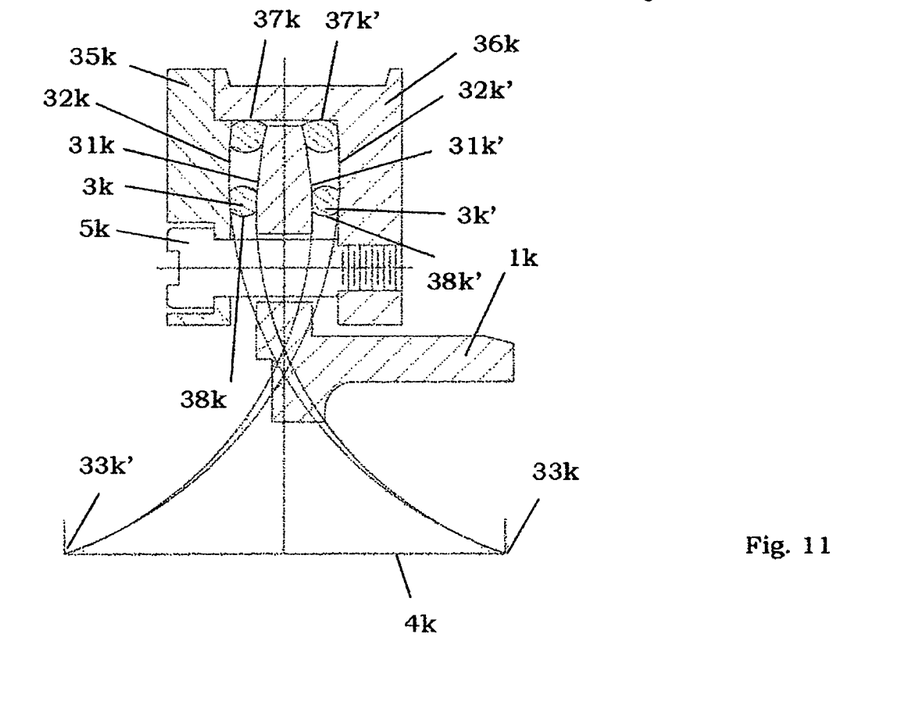
FIG. 11 is a cross-sectional view illustrating an embodiment of the invention in a TVD where the DACV-SDS comprises of two compound ACV-SDSs each comprising of a plurality of smaller sections having a compound concave and a compound convex surface oriented with their compound concave surfaces being axially proximate.

FIG. 11 illustrates a TVD including another embodiment of the invention using a DACV-SDS comprising of two identical compound ACV-SDSs 3k and 3k' that comprise of a plurality of pre-molded ring segments including but not limited to O-rings, X-rings, Square-rings etc. that axially bound hub 1k on either side and are axially bounded by a two-piece compound ring 35k and 36k. The TVD is held together by a plurality of shoulder bolts 5k. Such a construction is essentially non-bonded and behaves like two compound ACV-SDSs working in parallel. Compound Arcuate surfaces 31k and 32k are bounded at their radially outermost periphery by surface 37k and at their radially innermost periphery by surface 38k. ACV-SDSs are such that compound arcuate surfaces 31k and 32k of compound ACV-SDS 3k when extended along their non-linear arcuate paths form an ACV and a POT 33k at ACL 4k. Similarly, compound arcuate surfaces 31k' and 32k' are bounded at their radially outermost periphery by surface 37k' and at their radially innermost periphery by surface 38k'. Compound arcuate surfaces 31k' and 32k' of compound ACV-SDS 3k' when extended along their non-linear arcuate paths form an ACV and a POT 33k' at ACL 4k'. Furthermore, compound ACV-SDS 3k has one compound concave surface 31k and one compound convex surface 32k, and compound ACV-SDS 3k' has one compound concave surface 31k' and one compound convex surface 32k'. The compound concave surfaces 31k and 31k' are mutually axially proximate.

The advantages yielded by ACV-SDS over the conventional CV constructions and by the DACV-SDS over the conventional DCV constructions are primarily due to the ability to alter the geometry of the ACV-SDS and the DACV-SDS. The consequence of this flexibility allows: (1) packaging the TVD resulting in a smaller radial envelope; (2) a greater range for tuning the torsional frequency of the resulting TVD; and (3) improved modal decoupling of the torsional vibratory mode shape of the resulting TVD; while simultaneously not compromising the advantages yielded by the CV and DCV constructions i.e. a uniform strain buildup through the elastomer section due to the radial cross-sectional area of the ACV-SDS and DACV-SDS increasing proportionately with their radial distance from the ACL.

The reasoning for these three advantages is the increased flexibility of the invention's geometry that allows the elastomer to be inclined to the ACL through an angle of 0 degrees to 90 degrees.

The non-limiting TVD examples provided above are only a small subset of designs that can benefit from the ACV-SDSs and the DACV-SDSs. In fact, any TVD that currently utilizes a CV or DCV design such as those disclosed with respect to the prior art FIGS. 1-4, can take advantage of the invention disclosed herein.

The invention claimed is:

1. A polymer based arcuate common vertex spring damper system that is axis-symmetric about an axial centerline comprising:
   a first arcuate, radially oriented, annular surface having a first radial periphery proximate to the axial centerline, and a second radial periphery distal to the axial centerline;
   a second arcuate, radially oriented, annular surface offset from the first arcuate, radially oriented, annular surface, having a third radial periphery proximate to the axial centerline, and a fourth radial periphery distal to the axial centerline;
   a third axially oriented surface that bounds the first and the second arcuate, radially oriented, annular surfaces at their first and third radial peripheries respectively; and
   a fourth axially oriented surface that bounds the first and the second arcuate, radially oriented, annular surfaces at their second and fourth radial peripheries respectively;
   wherein the first and the second arcuate radially oriented, annular surfaces share a coincidental arcuate common vertex, and a mutual point of tangency located at the axial centerline.

2. The polymer based arcuate common vertex spring damper system of claim 1 where the construction material is a thermoset elastomer.

3. The polymer based arcuate common vertex spring damper system of claim 1 where the construction material is a thermoplastic elastomer.

4. The polymer based arcuate common vertex spring damper system of claim 1 where the construction material is a synthetic polymer.

5. A torsional vibration damper including the polymer based arcuate common vertex spring damper system of claim 1.

6. A polymer based dual arcuate common vertex spring damper system that is axis-symmetric about an axial centerline comprising:
   a first polymer based arcuate common vertex spring damper system further including:
      a first arcuate, radially oriented, annular surface having a first radial periphery proximate to the axial centerline, and a second radial periphery distal to the axial centerline;
      a second arcuate, radially oriented, annular surface offset from the first arcuate, radially oriented, annular surface, having a third radial periphery proximate to the axial centerline, and a fourth radial periphery distal to the axial centerline;
      a third axially oriented surface that bounds the first and the second arcuate, radially oriented, annular surfaces at their first and third radial peripheries respectively; and
      a fourth axially oriented surface that bounds the first and the second arcuate, radially oriented, annular surfaces at their second and fourth radial peripheries respectively;
      wherein the first and the second arcuate radially oriented, annular surfaces of the first polymer based arcuate common vertex spring damper system share a first coincidental arcuate common vertex, and a first point of tangency located at the axial centerline;
   a second polymer based arcuate common vertex spring damper system that is axially offset from the first polymer based arcuate common vertex spring damper system further including:
      a first arcuate, radially oriented, annular surface having a first radial periphery proximate to the axial centerline, and a second radial periphery distal to the axial centerline;
      a second arcuate, radially oriented, annular surface offset from the first arcuate, radially oriented, annular surface, having a third radial periphery proximate to the axial centerline, and a fourth radial periphery distal to the axial centerline;
      a third axially oriented surface that bounds the first and the second arcuate, radially oriented, annular surfaces at their first and third radial peripheries respectively; and
      a fourth axially oriented surface that bounds the first and the second arcuate, radially oriented, annular surfaces at their second and fourth radial peripheries respectively;
      wherein the first and the second arcuate radially oriented, annular surfaces of the second polymer based arcuate common vertex spring damper system share a coincidental second arcuate common vertex, and a second point of tangency located at the axial centerline.

7. The polymer based dual arcuate common vertex spring damper system of claim 6 where the construction material is a thermoset elastomer.

8. The polymer based dual arcuate common vertex spring damper system of claim 6 where the construction material is a thermoplastic elastomer.

9. The polymer based dual arcuate common vertex spring damper system of claim 6 where the construction material is a synthetic polymer.

10. A torsional vibration damper including the polymer based dual arcuate common vertex spring damper system of claim 6.

11. A polymer based compound dual arcuate common vertex spring damper system that is axis-symmetric about an axial centerline comprising:
   a first polymer based compound arcuate common vertex spring damper system further including:
      a first plurality of arcuate, radially oriented, annular surfaces, each having a first plurality of radial peripheries proximate to the axial centerline, and a second plurality of radial peripheries distal to the axial centerline;
      a second plurality of arcuate, radially oriented, annular surfaces offset from the first plurality of arcuate, radially oriented, annular surfaces, having a third plurality of radial peripheries proximate to the axial centerline, and a fourth plurality of radial peripheries distal to the axial centerline;

a third plurality of axially oriented surfaces that each bound the first plurality of arcuate, radially oriented, annular surfaces and the second plurality of arcuate, radially oriented, annular surfaces at their first and third plurality of radial peripheries respectively; and a fourth plurality of axially oriented surfaces that each bound the first plurality of arcuate, radially oriented, annular surfaces and the second plurality of arcuate, radially oriented, annular surfaces at their second and fourth plurality of radial peripheries respectively;

wherein the first and the second compound arcuate radially oriented, annular surfaces of the first polymer based compound arcuate common vertex spring damper system share a coincidental first arcuate common vertex, and a first point of tangency located at the axial centerline;

a second polymer based compound arcuate common vertex spring damper system that is axially offset from the first polymer based compound arcuate common vertex spring damper system further including:

a first plurality of arcuate, radially oriented, annular surfaces, each having a first plurality of radial peripheries proximate to the axial centerline, and a second plurality of radial peripheries distal to the axial centerline;

a second plurality of arcuate, radially oriented, annular surfaces, each having a first plurality of radial peripheries proximate to the axial centerline, and a second plurality of radial peripheries distal to the axial centerline;

a third plurality of axially oriented surfaces that each bound the first plurality of arcuate, radially oriented, annular surfaces and the second plurality of arcuate, radially oriented, annular surfaces at their first plurality of radial peripheries respectively; and a fourth plurality of axially oriented surfaces that each bound the first plurality of arcuate, radially oriented, annular surfaces and the second plurality of arcuate, radially oriented, annular surfaces at their second plurality of radial peripheries respectively;

wherein the first and the second compound arcuate radially oriented, annular surfaces of the second polymer based compound arcuate common vertex spring damper system share a coincidental second arcuate common vertex, and a second point of tangency located at the axial centerline.

12. The polymer based compound dual arcuate common vertex spring damper system of claim 11 where the construction material is a thermoset elastomer.

13. The polymer based compound dual arcuate common vertex spring damper system of claim 11 where the construction material is a thermoplastic elastomer.

14. The polymer based compound dual arcuate common vertex spring damper system of claim 11 where the construction material is a synthetic polymer.

15. A torsional vibration damper including the polymer based compound dual arcuate common vertex spring damper system of claim 11.

\* \* \* \* \*